(12) United States Patent
Neresini et al.

(10) Patent No.: US 9,181,404 B2
(45) Date of Patent: Nov. 10, 2015

(54) MANUFACTURE OF LEATHER AND FABRIC FROM MATERIALS CONTAINING PROTEIN HYDROLYSATES AND GELATINS

(75) Inventors: Massimo Costantino Neresini, Chiampo (IT); Luciana Sartore, Chiampo (IT); Manuela Cinzia Candido, Chiampo (IT); Marco Fogato, Chiampo (IT)

(73) Assignee: SICIT CHEMITECH S.P.A., Chiampo (IT)

( * ) Notice: Subject to any disclaimer, the term of this patent is extended or adjusted under 35 U.S.C. 154(b) by 855 days.

(21) Appl. No.: 12/665,089

(22) PCT Filed: Jun. 20, 2008

(86) PCT No.: PCT/EP2008/004964
§ 371 (c)(1),
(2), (4) Date: Feb. 5, 2010

(87) PCT Pub. No.: WO2008/155125
PCT Pub. Date: Dec. 24, 2008

(65) Prior Publication Data
US 2010/0190925 A1    Jul. 29, 2010

(30) Foreign Application Priority Data
Jun. 20, 2007 (IT) .............................. MI2007A1236

(51) Int. Cl.
*C08H 1/06* (2006.01)
*C08L 89/06* (2006.01)

(52) U.S. Cl.
CPC .. *C08H 1/06* (2013.01); *C08L 89/06* (2013.01)

(58) Field of Classification Search
CPC ................................. C08H 1/06; C08L 89/06
USPC .......................................... 524/797; 525/54.1
See application file for complete search history.

(56) References Cited

U.S. PATENT DOCUMENTS 6,117,979 A * 9/2000 Hendriks et al. .............. 530/356
2003/0083389 A1   5/2003 Kao et al.

FOREIGN PATENT DOCUMENTS

| BE | 1 008 639 | 7/1996 |
|----|-----------|--------|
| CA | 1 180 622 | 1/1985 |
| EP | 0 898 973 | 3/1999 |
| WO | 01/12723 | 2/2001 |
| WO | 2008/075279 | 6/2008 |

* cited by examiner

*Primary Examiner* — Julie Ha
(74) *Attorney, Agent, or Firm* — Silvia Salvadori, P.C.; Silvia Salvadori

(57) ABSTRACT

Polymer blends and/or adducts obtainable from protein hydrolysates and/or gelatins used as raw material for the manufacture of regenerated leather and fabrics. Polymer adducts and/or blends conveniently prepared, tanned and finished can replace natural leather or fabric in the manufacture of clothing and consumer articles with particular technological properties.

9 Claims, 2 Drawing Sheets

Phases of repair of skins with a POL materials

MANUFACTURE OF LEATHER AND FABRIC FROM MATERIALS CONTAINING PROTEIN HYDROLYSATES AND GELATINS

This application is a 371 of PCT/EP2008/004964 filed on Jun. 20, 2008, which claims priority to and the benefit of Italian Application No. MI2007A1236 filed on Jun. 20, 2007, the contents of which are incorporated herein by reference.

FIELD OF INVENTION

This invention relates to materials obtainable by a process which comprises:
a) Derivatisation of protein hydrolysates or gelatins, originating from hides or animal or vegetable products or by-products or processing residues coming from leather production process before and after the tanning process, with polymers having functions able to react with amine and/or carboxyl and/or peptide groups present in the hydrolysates or gelatins. These polymer derivatives can be obtained by chemical reaction in liquid phase or reactive blending. The materials obtained can be cross-linked and/or reinforced with fillers and/or fibres and/or fabrics; they are characterised by a high level of mechanical performance and a structure compatible with and similar to leather. They consequently present the same reactivity to the tanning liquors and/or dyes and/or finishing agents and/or waterproofing agents commonly used in the tanning industry;
b) treatment of the structures obtained in a) with tanning substances and/or dyes and/or finishing agents and/or waterproofing agents etc. commonly used in the tanning industry.

The invention also relates to the use of said materials to prepare consumer products, such as footwear, luggage, upholstery, clothing, clothing accessories and articles of clothing, vehicle bodywork and furnishings possibly after oiling, dyeing and finishing treatments.

PRIOR ART

Leather, which is obtained from animal hides by tanning processes that make the starting organic material non-putrescible, is widely used in the manufacture of footwear, bags, clothing, and leather goods in general. Natural leather is often an expensive, luxury material, and the need is therefore felt in particular industries for an artificial leather obtainable from raw materials which are cheap, recycled, or possess particular qualities and/or properties.

For example, "regenerated leather", also known as "leather substitute", has been proposed for this purpose; it is prepared simply by agglomeration and compression, with or without leather waste binders, or by chopping and crushing to a paste which is sieved, laminated and calendered in sheets, with or without the addition of binders and polymers. The leather thus obtained has the typical texture and appearance of real hide, but limited resistance to tearing. It can be dyed, polished, pressed, buffed, painted and metallised.

Imitation leathers consisting of materials of synthetic origin are also available on the market, which are cheaper than natural leather and have a comparable performance. However, even these products do not fully meet the industrial needs of leather goods manufacturers.

DESCRIPTION OF THE INVENTION

Figure 1:
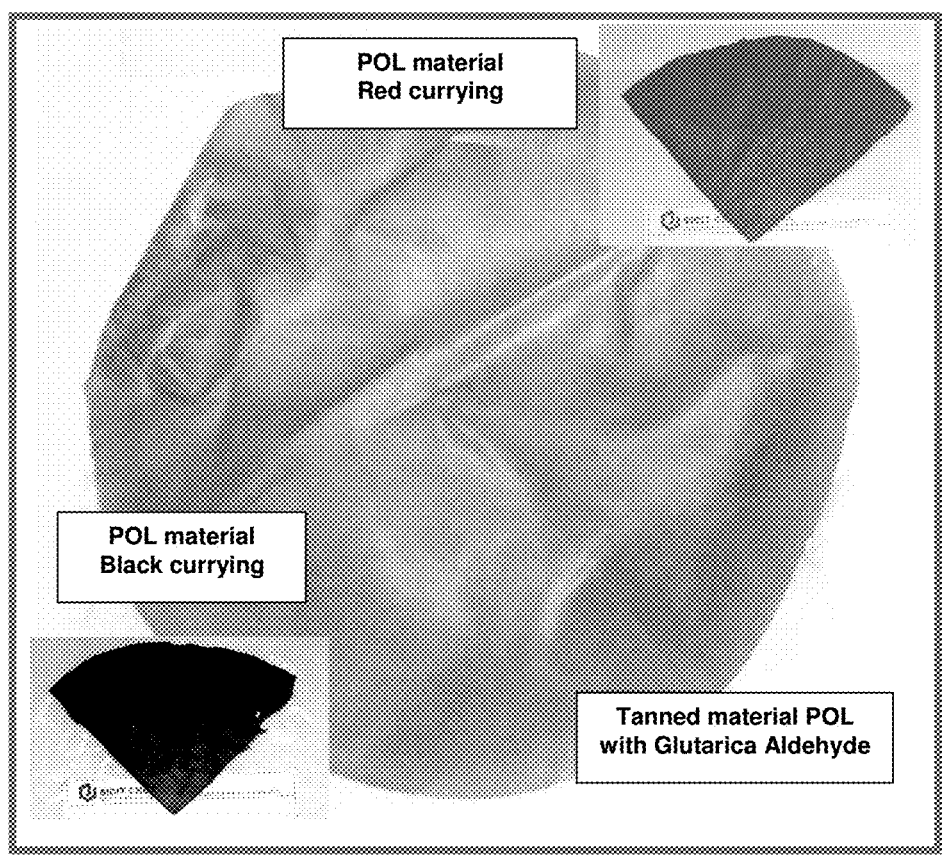
FIG. 1 shows the determination of the gelling or contraction temperature which indicates the stabilization of the material.

It has now been found that it is possible to obtain artificial leather with characteristics very similar to those of natural leather from protein hydrolysates or gelatins originating from hides or hide processing residues, which are derivatised with polymer materials that possess functions able to react with amine and/or carboxyl and/or peptide groups present in the hydrolysates or gelatins, to produce structures whose reactivity to various tanning and/or preservative and/or dyeing agents, etc. is similar to that of leather. The materials obtained can be moulded and embossed or processed to make films, yarns or layers of different thicknesses, possibly with inserts of different materials.

The protein hydrolysates and gelatins can be chemically derivatised by chemical reaction in liquid phase to produce adducts containing segments with a peptide base chemically bonded to segments with a polymer base by a variety of processes.

Protein hydrolysates and/or gelatins, subjected to reactive blending with functional copolymers, and possibly other agents such as plasticisers, cross-linkers and transfer agents, also give rise to a variety of blends.

Protein hydrolysates obtained from products and/or by-products of vegetable and animal origin such as soya, corn gluten and milk also present characteristics which make them usable to manufacture the materials disclosed in this patent with a variety of characteristics, which can meet particular operational requirements.

Polymer materials obtained from protein hydrolysates and/or gelatins can be subjected to extrusion, moulding, embossing, spinning, and filming. Finally, they are treated with the usual tanning and finishing techniques to give them the required technological properties.

The novel materials thus obtained have some of the technological characteristics of leather, such as heat resistance, resistance to chemical agents and chemical reactivity, and some special characteristics, such as their particular feel and considerable strength, and can easily be processed to obtain yarns, thin films and prints.

The novel materials can be considered innovative because they consist partly of materials of natural origin (protein hydrolysates and gelatins) and partly of synthetic material, by contrast with regenerated and synthetic leather and wholly synthetic fabrics.

As the novel materials have similar characteristics to leather, they can also be used as leather stucco. Leather stuccoes currently consist of polymers in aqueous dispersion; they are characterised by the ability to fill spaces caused by defects such as scars, scratches, cuts and wrinkles with a strong, flexible, adhesive material, with the advantage of allowing the use of second-grade hides. As the novel materials adhere well to leather and have an exceptional affinity for dyes, they can also be used to repair and reconstruct the leather missing from holes. The new materials can easily be used by simple spreading, spraying, compression moulding or thermocompression.

As the novel materials have similar characteristics to leather, they can also be used as binders for by-products and/or industrial products such as by-products of leather processing, e.g. shaving, or wool and cotton processing residues, for the manufacture of leather substitutes and fabrics.

According to the invention, the materials consist of protein hydrolysates and gelatins originating from hide manufacturing residues or hides, basically consisting of partly hydrolysed collagen, derivatised with polymers, with the possible addition of plasticisers, crosslinkers and reinforcing agents, and are characterised by a compact, cross-linked structure. Said materials, subsequently called "POL", have sufficient stability and reactivity under the conditions required by tanning and finishing operations, and allow the preparation of yarns, layers and films of various thicknesses.

Examples of suitable POL materials are described in patent application RM2006A000682; they contain peptide-based segments of protein hydrolysates and gelatins, chemically bonded to segments of polyoxyethylene polymers. In particular, materials of formula (1) can be used:

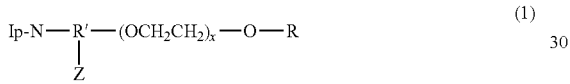

including the reaction in water or aqueous solvent of a protein hydrolysate or gelatin of formula (3), and/or their mixtures

 (3)

with a compound of formula (4)

 (4)

wherein
Ip is the aminoacid, peptide or polypeptide residue of the protein hydrolysate or gelatin;
Z is —H or —R'—(OCH$_2$CH$_2$)$_x$—O—R;
x is an integer

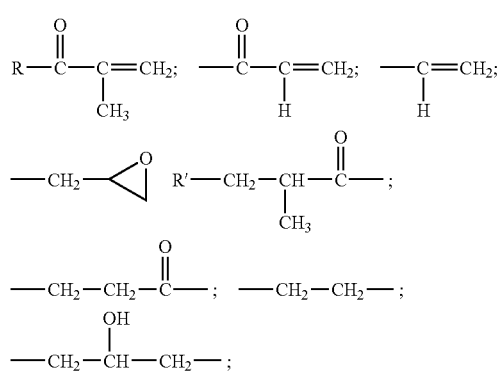

The adducts of formula 1 can be cross-linked by the addition of a condensation or cross-linking agent or a free radical initiator, preferably chosen from the class formed by amines, persulphates, peroxides and azo compounds.

The products of formula (1) can also be copolymerised with acrylic or vinyl monomers and lead to adducts of formula (2) which are also usable as POL materials:

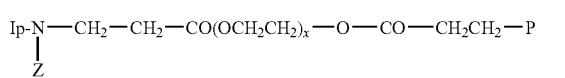 (2)

comprising a reaction between a compound of formula (1) with an acrylic and/or vinyl polymer (or monomers) of general formula (5)

 (5)

wherein
Ip is the aminoacid, peptide or polypeptide residue of the protein hydrolysate or gelatin;
Z corresponds to —H or —R'—(OCH$_2$CH$_2$)$_x$—O—R or —CH$_2$—CH$_2$—CO(OCH$_2$CH$_2$)$_x$—O—CO—CH$_2$CH$_2$—P;
x is an integer
R corresponds to

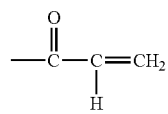

R' corresponds to

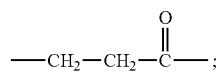

P is an acrylic or vinyl polymer of general formula (5) wherein

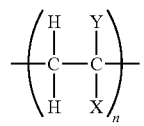

Y corresponds to H, CH$_3$, Cl, Br or F;
X corresponds to Cl, Br, F, H,

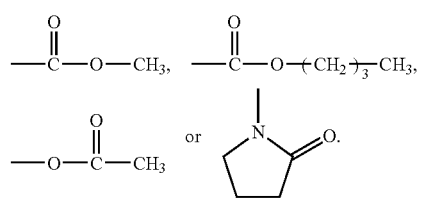

Other suitable POL materials are the blends described in patent MI2007A762, i.e. blends obtainable by reactive mixing of a hydrolysate or gelatin or mixtures thereof with functional copolymers, and possibly other compounds. In particular, the invention relates to protein hydrolysate-EVA (ethylene vinyl acetate) blends, gelatin-EVA and protein hydrolysate-EVAL (ethylene vinyl alcohol) blends, and gelatin-EVAL blends. The obtainable materials consist of a complex structure formed by a skeleton of polyethylene chains and polypeptide chains which can be described as graft copolymers.

Said POL materials basically consist of adducts containing segments of polypeptide structures chemically bonded to segments with a polymer base which may be crosslinked, and are suitable for processing to obtain yarns, layers and films of various thicknesses.

The fact that they contain protein hydrolysate and/or gelatins makes the POL materials suitable to exploit current tanning technology which involves the stabilisation and processing of material by exploiting the chemical properties of affinity and reactivity characteristic of proteins.

Only some of the functional groups and peptide bonds of the protein hydrolysates and/or gelatins were involved in the synthesis reactions of the POL materials. The peptide structure belonging to the POL materials still contains functional groups and peptide bonds able to react according to the mechanisms involved in tanning processes in the same way as natural leather.

Reinforcing agents such as fibres, preferably made of cellulose, leather and/or fabric products and/or byproducts, inorganic fillers such as $CaCO_3$ or microparticulate silica, crosslinking and hardening agents such as peroxides and diamines, and plasticisers such as polyethylene glycol, can be added to POL materials to improve and optimise their heat resistance, mechanical characteristics, dimensional stability and flexibility. These additives also help to improve the appearance of the repaired, reconstructed or stuccoed parts.

Current tanning technology can be used directly from the actual tanning stage, as pre-tanning operations are unnecessary in the case of POL materials. The tanning liquors which can be used are those based on conventional processes using tanning substances of vegetable origin or inorganic substances such as chromium salts, or possibly other tanning materials (such as organic chromium, aluminium salts and glutaraldehyde). Mixed tanning systems can also be used to improve the quality of the end product. The tanning liquors are chosen according to the type of material tanned and the characteristics of the end product.

The materials obtained after tanning and finishing may be films of different thicknesses or yarns suitable for making fabrics. They have innovative properties in technological and organoleptic terms. They also have the advantage of having two sides with the same characteristics, as opposed to the grain side and flesh side characteristic of natural leather.

Application tests have demonstrated that POLs are also compatible with the pre-tanning agents traditionally used on leather, such as sulphochlorinated paraffin, which is used as a tanning agent for hides destined for oil tanning and to increase their tensile strength.

Application tests also show that these materials can be conveniently used as leather stuccoes because they have similar mechanical characteristics to leather, adhere well to the hide and have a considerable affinity for dyes, and therefore guarantee even colouring, mechanical strength and embossing. Patching tests involving reconstruction of the leather missing from holes have also given satisfactory results. Application tests involving stuccoing and reconstruction were performed by spreading, spraying and fusion of the material in powder form by pressing.

Application Examples

The examples below describe some embodiments of the invention. Some of them are shown in FIG. 1. Some simple tests have been carried out, such as determination of the gelling or contraction temperature which indicates the stabilisation of the material. The materials used in the tests described do not require all the processes typical of tanning designed for hide preparation, such as maceration. The materials used swell at relatively low pH values, have a more limited swelling capacity with the use of β-naphthalenesulphonic acid, and can be dehydrated as required to promote compacting by the action of salts.

Anti-fermentation products, surfactants and complexing agents which are added to improve the reliability of the process were not introduced or considered. The enzymes and decalcifying agents used in traditional tanning are not required.

In the application tests, it was found that the high reactivity of the tanning liquors with the materials tested suggests the possibility of applications of simpler technologies not involving intensive mechanical stirring of the hide, which has a complex fibrous structure.

Other application tests demonstrated that other types of tanning, such as formaldehyde, glutaraldehyde, aluminium and organic chrome tanning, are also feasible.

The materials obtained were tested for oiling and dyeing, which proved possible and satisfactory.

The materials according to the invention can be made with minimal thicknesses and particular mechanical properties, in addition to the characteristic of having the same surfaces on both sides.

The tanning liquors are fixed efficiently and evenly: the tanning liquors are exhausted in the tanning baths, the materials proved to have sufficient reactivity, and the release tests indicated that there is no release of the tanning materials.

It was found that after tanning, these materials can be oiled, dyed and finished so that the leather can be used to make various leather goods (such as footwear, luggage, upholstery, clothing, clothing accessories and articles of clothing, vehicle bodywork and furnishings).

Example 1

Chrome Tanning 50 g of a solution containing 3.2 g of chromium sulphate with a basicity of 25-50% was added to 50 g of a polymer material described in patent application RM2006A000682, dried in layers. A slow-dissolving basifying agent containing 0.4 g magnesium oxide was added.

The polymer material swells in water, and clearly begins to change colour from the first stages of treatment. The material was left under stirring for 8 hours.

The temperature of the tanning bath rose gradually from 20° C. to 32° C.

The tests demonstrated that the chromium effectively bonded to the protein material to form a content of 0.70% $Cr_2O_3$ on the dry material. The contraction temperature, tested on a small dried portion, is 72° C., close to the reference contraction temperature for tanning liquors based on tannin.

The COD and TKN values are comparable to the initial values, indicating that under these conditions there is no breakdown of the protein structure of the material. The chromium is distributed evenly through the sample. Subsequent tests also indicated good exhaustion of the chromium in the tanning bath.

The material obtained was removed from the tanning bath, washed with 50 g of a solution containing 0.1% formic acid, and added to 50 g of a sodium bicarbonate solution to neutralise the material.

The results of acid sweat release tests indicate that the chromium bonds stably to the material.

Tanning tests were performed with blends prepared in discs as described in application MI2007A762, and in particular with materials obtained from EVA and protein hydrolysate, with protein hydrolysate contents of 30-50% w/w, using tanning baths maintained at the temperature of 45° C. containing 2% of some commercial products such as Salcromo and Baychrom F having different basicities, namely 33% and 50% respectively. The experimental tests conducted on the materials involved 24 hours' immersion in water to allow swelling, and 24 hours' immersion in tanning baths containing 2% chromium salt. The washed and dried materials have a $Cr_2O_3$ content amounting to 0.4-0.9% of the dry material. Once again, the acid sweat release tests indicate that the chromium is efficiently fixed.

The dyeing tests conducted on the starting material and the tanned material show complete, even fixing of the dyes generally used in the tanning industry.

After dyeing, the materials were treated at 55° C. with a 1% solution of a waterproofing product also containing 0.5% grease and 0.5% of a silicone product. The material thus obtained is water-repellent.

Example 2

Vegetable Tanning 50 g of a solution containing 35% commercial tannin at pH 3.5 was added to 20 g of a blend prepared in film form as described in application MI2007A762, and the mass was left under stirring for 48 hours at the temperature of 37° C. The material was then drained and washed.

The material is darker and has a contraction temperature of 70° C.

In particular, tests conducted on discs prepared as described in application MI2007A762, consisting of EVA and protein hydrolysate containing 50% protein hydrolysate, using pyrogallic and catechinic acid at the concentration of 10% w/w for 24 hours after 24 hours' immersion in water, confirmed the considerable affinity of tannin-based tanning liquors for plastic materials prepared with protein hydrolysates.

When the finished tanned materials were washed, no release of substances was observed. The mechanical strength properties are comparable.

Subsequent tests, conducted by adding reinforcing cellulose fibres to the starting material, demonstrated a high degree of compatibility and allowed easy operational handling.

Dyeing tests, conducted on the starting material and the tanned material, demonstrated that the dyes generally used in the tanning industry were completely fixed.

Finishing tests conducted on the tanned material gave good results in terms of yield and fastness.

4. Glutaraldehyde Tanning

A disc prepared as described in application MI2007A762, consisting of EVA and protein hydrolysate containing 50% protein hydrolysate, was washed and dried after 24 hours' immersion in water and treatment with a 2% w/w solution of glutaraldehyde in a thermostatic bath at 45° C. The product thus obtained has an appearance and feel similar to those of real leather. The dyeing and finishing tests demonstrated good affinity. The embossing tests conducted on the sample demonstrated the possibility of using this technique, which gives the material a particular uniform grain.

The dyeing tests demonstrated a considerable affinity with the dyes generally used, as demonstrated by the lack of release in water; in general, prematallised dyes and cationic dyes give deep, even colours, whereas anionic dyes, despite having a good affinity, tend to give uneven colouring, although the effect may be useful for some specific applications.

5. Pre-Tanning with Sulphochlorinated Paraffin

Pre-tanning tests, conducted with a commercial sulphochlorinated paraffin, involved simple immersion of the disc, obtained from a material described in patent MI2007A762 consisting of EVA (50%) and hydrolysate (50%), for 24 hours in a 10% solution. The material obtained, when washed and dried, has characteristics of softness and strength similar to those of leather.

6. Stuccoing Tests on Leather with Scratches and/or Holes

Scratched hides were "repaired" by spreading and spraying products obtained with the polymer materials described in patent application RM2006A000682; they were then buffed with 180 grain (coarse-grain) paper, followed by 320 grain (fine-grain) paper. The hides were then left to stand for an hour, and finished with a spray technique using a mixture containing oil, casein, pigment, and acrylic and polyurethane resin dispersed in water. After a drying stage at 100° C. for two minutes, the hides were left to stand for 10-15 minutes.

The adherence tests on the finish demonstrate that the finish is stable, even in the scratched areas, thus demonstrating excellent adherence between finishing film and polymer, and between polymer and hide.

Using the polymer materials obtained in patent MI2007A762, scratched hides were "repaired" by hot-pressing and holes in hides were "filled" by filling and subsequent hot-pressing. The materials proved stable at the pressing temperatures (90° C.) and resistant to buffing and finishing operations conducted as described above. Once again, the finishing adherence tests demonstrate that the finishing is stable even in the areas with scratches or holes, thus demonstrating excellent adherence between finishing film and polymer and between polymer and hide. The hole-filling material has good dimensional stability.

Subsequent tests involving "patching" of holes gave particularly advantageous results using cellulose fibres and inert supporting materials together with the polymer materials disclosed in patent MI2007A762.

The hides thus repaired were embossed at temperatures of between 80 and 140° C. at a pressure of 100-150 bars for an average contact time of around 5-6 sec. The result was highly satisfactory, and the POL material also presents characteristics similar to leather after this operation.

After the embossing stage, the repaired leather samples were fulled to ensure suitable softness. The milling process involves average operating times of between 8 and 24 hours, with moisture percentages of between 0 and 50%.

The result was also satisfactory after this operation.

Figure 2:
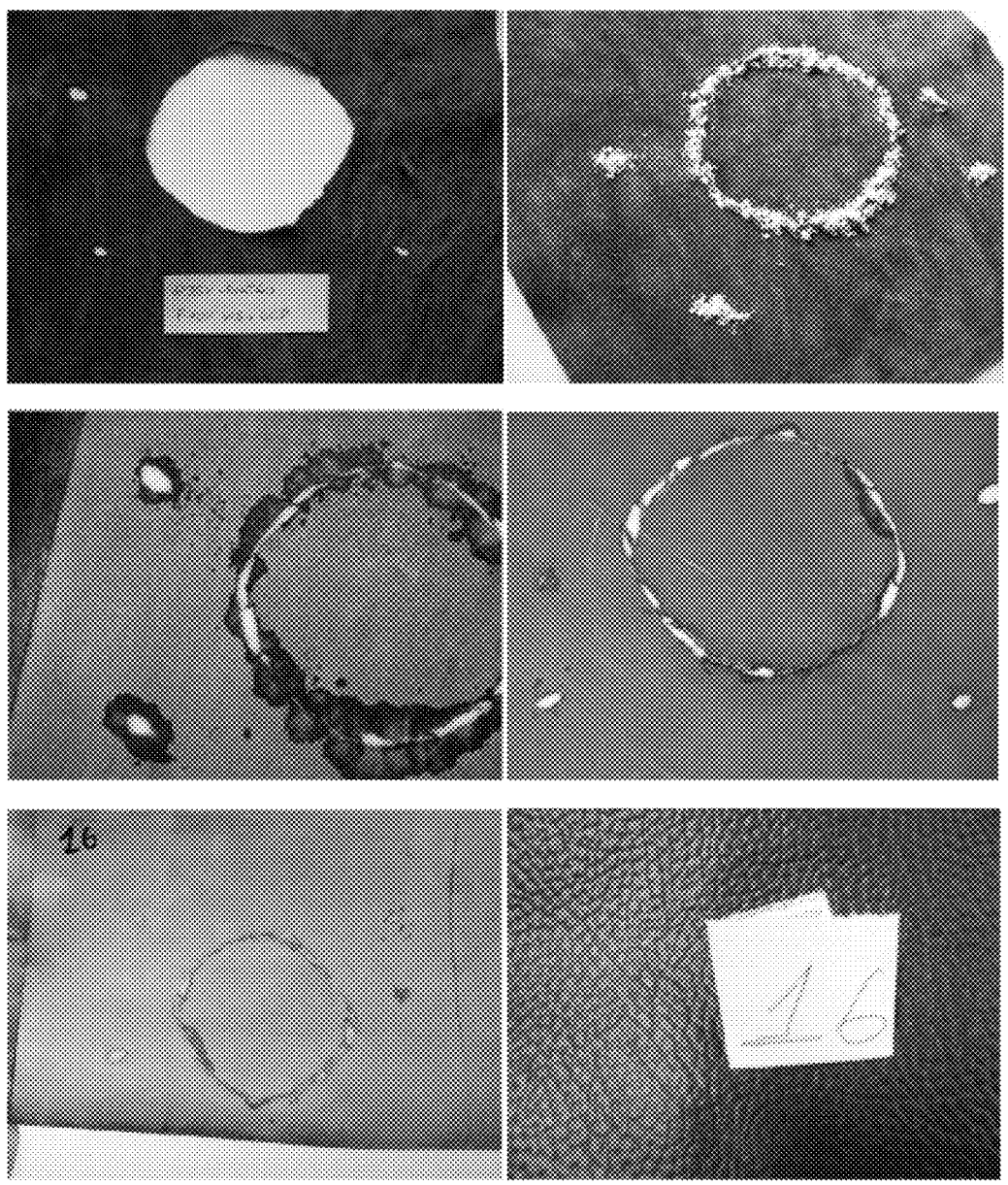
FIG. 2 shows phases of repair of skins with a POL material.

The stages of leather repair with a POL material are shown in FIG. 2.

The invention claimed is:

1. Material obtainable by a process of derivatization with polymers of protein hydrolysates or gelatins by means of:
   a) reactive blending of protein hydrolysates or gelatins, originating from hides or hide processing residues of formula (3):

IpNH$_2$                          (3)

wherein Ip is the amino acid, peptide or polypeptide residue of the protein hydrolysate or gelatin, with polymers able to interact with amine and/or carboxyl and/or peptide groups present in the hydrolysates or gelatins, to produce structures compatible with and similar to natural leather in order to obtain materials that react with the substances commonly used in tanning and finishing;
   b) chemical reaction in liquid phase of protein hydrolysates or gelatins originating from hide manufacturing residues or hides of formula (3):

IpNH$_2$                          (3)

wherein Ip is the amino acid, peptide or polypeptide residue of the protein hydrolysate or gelatin, with functionalized polymers and oligomers able to react with amine and/or peptide groups present in the hydrolysates or gelatins to produce complex structures, which may include extensive cross-linking;
   wherein the functionalized polymers have formula (4):

R—(OCH$_2$CH$_2$)x-O—R           (4)

to obtain a material of formula (1):

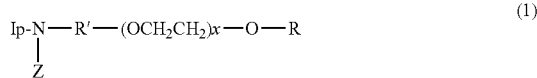

wherein
   x is an integer;
   R is

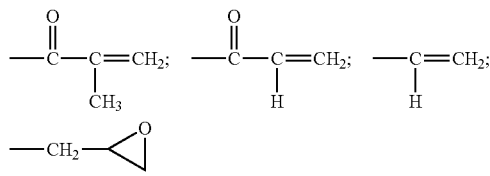

Ip, is as above defined:
   R' is

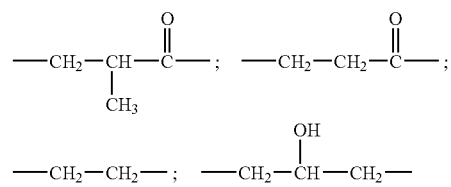

Z is —H or —R'—(OCH$_2$CH$_2$)x-O—R, being R, R' and x as above defined;
   or, the functionalized polymers are functional copolymers with an ethylene base having amine, carboxyl, hydroxyl, amide, ester or heterocyclic groups with a degree of substitution falling into the interval 1-100%.

2. The material obtainable by the process of claim 1 wherein the functionalized copolymers are copolymers based on polyethylene vinyl acetate.

3. The material obtainable by the process of claim 1, wherein said process further comprises a step of treating the complex structures with tanning substances and/or products used in leather processing, at the retanning and/or dyeing and/or fat liquoring and/or finishing stages.

4. The Material as claimed in claim 1, in form of yarns, layers or films of different thicknesses.

5. The material obtainable by the process of claim 1, wherein in step a) of said method, the reactive blending of protein hydrolysates and/or gelatins are obtained from by-products and/or waste and/or residues of the tanning cycle obtained before or after the tanning stage.

6. The material obtainable by the process of claim 1, wherein in step a) of said method the reactive blending of protein hydrolysates and/or gelatins are obtained from products and by-products, of vegetable or animal origin, of waste and/or residues of agrifood industry or waste in general.

7. The material obtainable by the process of claim 1 wherein said material is reinforced with particles, fibers, leather and/or fabric products and/or byproducts, or fabrics.

8. The Materials of claim 7, further comprising transesterification agents, crosslinking agents, plasticizers and antioxidants.

9. The material obtainable by the process of claim 1, wherein the tanning stage is performed by treatment with tannins, formaldehyde, glutaraldehyde, aluminum salts or chromium salts.

* * * * *